United States Patent

Mizuno et al.

[11] Patent Number: 5,365,661
[45] Date of Patent: Nov. 22, 1994

[54] CERAMIC-METAL COMPOSITE JOINT BODY

[75] Inventors: Takeyuki Mizuno, Toyohashi; Hiroyuki Kawase, Nagoya, both of Japan

[73] Assignee: NGK Insulators, Ltd., Japan

[21] Appl. No.: 155,158

[22] Filed: Nov. 19, 1993

Related U.S. Application Data

[63] Continuation of Ser. No. 860,206, Mar. 27, 1992, abandoned, which is a continuation of Ser. No. 315,916, Feb. 27, 1989, abandoned.

[30] Foreign Application Priority Data

Feb. 25, 1988 [JP] Japan ............................. 63-22975[U]

[51] Int. Cl.$^5$ ............................................. B23P 15/00
[52] U.S. Cl. ............................. 29/889.21; 29/889.2; 29/525
[58] Field of Search ............. 29/889.2, 889.61, 889.23, 29/452, 446, 525, 557, 558; 428/469, 472

[56] References Cited

U.S. PATENT DOCUMENTS

| | | | |
|---|---|---|---|
| 4,156,051 | 5/1979 | Nakamura et al. | 29/889.21 |
| 4,281,941 | 8/1981 | Rettenkolber | 29/889.2 |
| 4,501,095 | 2/1985 | Drinkuth et al. | 29/889.2 |
| 4,697,325 | 10/1987 | Kamigaito et al. | 29/889.2 |
| 4,719,074 | 1/1988 | Tsuno et al. | 29/889.2 |
| 4,719,075 | 1/1988 | Tsuno et al. | 29/889.2 |
| 4,810,585 | 3/1989 | Oda et al. | 428/469 |
| 4,854,025 | 8/1989 | Oda et al. | 29/889.2 |
| 4,962,002 | 10/1990 | Yoshida et al. | 29/889.2 |

OTHER PUBLICATIONS

Transactions of Japan Society of Mechanical Engineers, Sep., 1986, "The Effects of Surface Roughness and Size on Fitting Strength of Shrink Fit Between Ceramic and Metal", Isami Nitta et al.; pp. 2503–2507.

*Primary Examiner*—Irene Cuda
*Attorney, Agent, or Firm*—Parkhurst, Wendel & Rossi

[57] ABSTRACT

A ceramic-metal composite joint body wherein a projection of a ceramic member is connected to a metal member, having a construction such that a ratio D between a circularity c of an outer portion of the projection and an outer diameter d of the projection: i.e., $D=(c/d)\times 100(\%)$, is set to less than 0.03%. In this invention, since the ratio $D=(c/d)\times 100(\%)$ is set to less than 0.03%, a stress concentration generated at a connection edge of the projection of the ceramic member can be reduced, and thus a ceramic-metal composite joint body having good reliability and durability can be obtained.

6 Claims, 1 Drawing Sheet

CERAMIC-METAL COMPOSITE JOINT BODY

This is a continuation of application Ser. No. 07/860,206 filed Mar. 27, 1992, now abandoned, which in turn is a continuation of application Ser. No. 07/315,916 filed Feb. 27, 1989, now abandoned.

BACKGROUND OF THE INVENTION

1. Field of the Invention

The present invention relates to a ceramic-metal composite joint body.

2. Related Art Statement

Referring to FIG. 1, such a ceramic-metal composite joint body has a construction such that a projection 2 of a ceramic member 1 is inserted into a recess 4 of a metal member 3 by means of known connection methods such as pressure insertion, thermal insertion, chill insertion or combination methods between such connection methods and soldering.

In the ceramic-metal composite joint body mentioned above, dimensions such as shaft diameter, surface roughness, etc. of the projection 2 of the ceramic member 1 are controlled into a common difference with respect to standard values. However, a circularity of the projection 2 is not controlled.

Therefore, in the ceramic-metal composite joint body mentioned above, an excessive stress concentration occurs at a connection edge between the projection 2 of the ceramic member 1 and the recess 4 of the metal member 3 due to the shape of the projection 2 especially the circularity of an outer portion of the projection 2. As a result, breakage of the projection 2 might be generated.

In the case of a connection between a metal member and a metal member, the circularity is not a problem because the metal members exhibit elastic deformation. However, in the case of the connection between a ceramic member and a metal member as shown in FIG. 1, if the circularity of the projection 2 of the ceramic member 1 is bad, prior to the elastic deformation of the recess 4 of the metal member 3 an excessive stress concentration is applied to the projection 2 of the ceramic member 1 which does not exhibit an elastic deformation, and the crack is generated in the projection 2.

SUMMARY OF THE INVENTION

An object of the present invention is to eliminate the drawbacks mentioned above and provide a ceramic-metal composite joint body having good reliability.

According to the invention, a ceramic-metal composite joint body wherein a projection of a ceramic member is connected to a metal member, comprises a construction such that a ratio between a circularity "c" of an outer portion of the projection and an outer diameter "d" of the projection, i.e., $(c/d) \times 100(\%)$ is set to less than 0.03%.

In the construction mentioned above, since the circularity of the outer portion of the projection is controlled in a predetermined range, the stress concentration generated at the connection edge between the projection of the ceramic member and the recess of the metal member can be reduced effectively, and thus the ceramic-metal composite joint body having good reliability can be obtained.

In the present invention, since the stress concentration generated at the connection edge is not permissible when a ratio D={c(circularity of outer portion of projection)/d(outer diameter of projection)}×100(%) is more than 0.03%, breakage of the projection might occur. Therefore, the ratio D is limited to less than 0.03%.

In this invention, a term "circularity" is defined as a difference of radii between a circumscribed circle and an inscribed circle of the projection in an arbitrary cross section perpendicular to a shaft axis of the projection.

DESCRIPTION OF THE PREFERRED EMBODIMENTS

Figure 1:
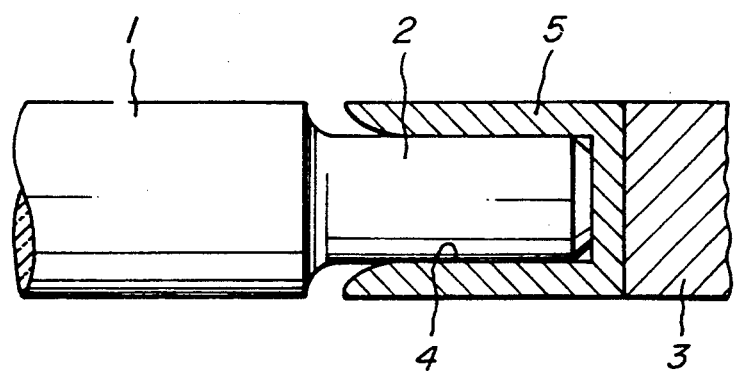
FIG. 1 is a partially cross sectional view showing an embodiment of a ceramic-metal composite joint body according to the invention.

FIG. 1 is a partially cross sectional view showing an embodiment of a ceramic-metal composite joint body according to the invention. In this embodiment, a projection 2 is arranged at one end of a ceramic member 1, and the projection 2 is inserted into a recess 4 of an intermediate member 5 to join the ceramic member 1 and the intermediate member 5. Moreover, one end of the intermediate member 5 is connected to a metal member 3.

As for the connection methods, use is made of the known connection methods such as a pressure insertion, thermal insertion, chill insertion and combinations thereof. In this case, a ratio D of (circularity of outer portion of projection prior to the connection)/(shaft diameter of projection) is set to less than 0.03%. Moreover, as for a ceramic material to be used, various known ceramics can be used, and among them it is preferred to use silicon nitride, silicon carbide, or sialon. Further, as for a metal material, it is preferred to use a precipitation hardening alloy, a heat resisting alloy, or the like.

Hereinafter, an actual embodiment will be explained.

EXAMPLE 1

Ceramic-metal composite join bodies shown in FIG. 1 were formed by pressure-inserting the projection 2 of the ceramic member 1 made of $Si_3N_4$ into the recess 4 of the intermediate member 5 made of Fe—Ni alloy. One end of the intermediate member 5 was friction-connected under pressure to the metal member 3 made of SNCM 439 alloy. Prior to the connection, the circularities and the shaft diameters of the projections were varied to obtain the ceramic-metal composite joint bodies having various circularities and shaft diameters.

After that, a heat cycle test was performed with respect to each ceramic-metal composite joint body between −20° C. and 250° C. That is to say, at first, the composite joint body was kept at −20° C. during 30 minutes and then returned to an atmosphere of 250° C. Such an operation was repeated one hundred times. After that, the intermediate member 5 was removed from the projection 2 of the ceramic member 1, and then crack generation was examined with respect to the projection of the ceramic member especially to the connection edge. The results are shown in Table 1.

TABLE 1

| D (%) | Sample No. | Results |
| --- | --- | --- |
| 0.0125 | 1 | normal |

TABLE 1-continued

| D (%) | Sample No. | Results |
|---|---|---|
| 0.03 | 2 | normal |
|  | 3 | normal |
|  | 4 | normal |
|  | 5 | normal |
|  | 6 | normal |
|  | 7 | normal |
|  | 8 | normal |
|  | 9 | normal |
|  | 10 | normal |
| 0.05 | 11 | crack formation |
|  | 12 | normal |
|  | 13 | crack formation |
|  | 14 | crack formation |
|  | 15 | normal |
| 0.1 | 16 | crack formation |
|  | 17 | crack formation |
|  | 18 | crack formation |
|  | 19 | crack formation |
|  | 20 | crack formation |

D = (circurality)/(outer diameter of projection of ceramic member) × 100(%)

From the results shown in FIG. 1, sample Nos. 1 to 10, which set the ratio D to less than 0.03%, exhibit better results compared to sample Nos. 11 to 20, which set the ratio D to more than 0.03%.

EXAMPLE 2

Figure 2:
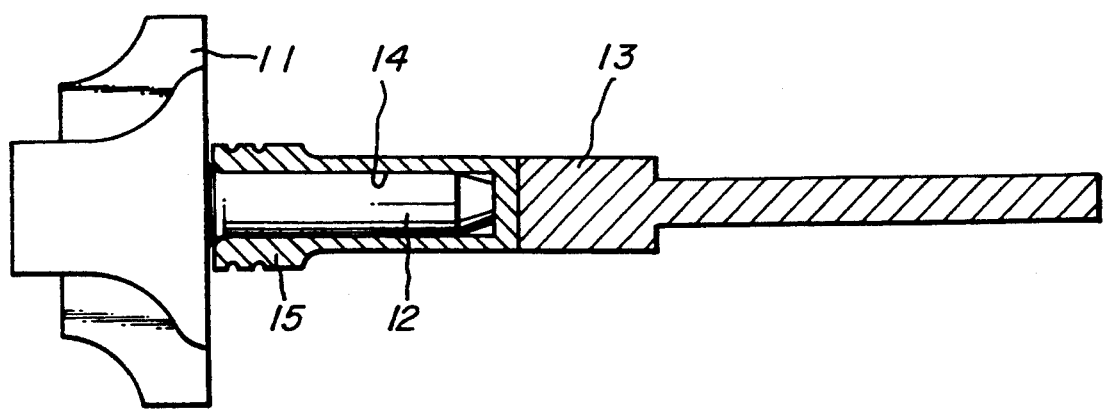
FIG. 2 is a partially cross sectional view illustrating another embodiment of the ceramic-metal composite joint body according to the invention.

Ceramic turbo charger rotors shown in FIG. 2 were formed by pressure-inserting a projection 12 of a ceramic rotor 11 made of $Si_3N_4$ into a recess 14 of an intermediate member 15 made of a precipitation hardening alloy. One end of the intermediate member 15 was connected to a metal shaft 13 made of SNCM439 alloy by an electric beam welding method. In this case, dimensions of the projection 12 of the ceramic rotor 11 were set to the shaft diameter of 12 mm, the circularity of 2.5 μm, and the ratio D=0.021%. Moreover, dimensions of the recess 14 of the intermediate member 15 were set to an inner diameter of 11.91 mm and an outer diameter of 17.2 mm. Further, the heat treatment for the precipitation hardening was performed with respect to the composite joint body.

The thus obtained turbo charger rotor was installed in an engine, and a GO-STOP test was performed. In the GO-STOP test, the turbo charger rotor was rotated at a circumferential velocity of 400 m/sec in an exhaust temperature of 900° C. for 15 minutes, and then the rotation was stopped for 5 minutes. Such an operation cycle was repeated 300 times. However, after that, no failures were detected in the ceramic turbo charger rotors. Further, the intermediate member 15 was removed from the projection 12, and then the crack generation was examined with respect to the projection of the ceramic rotor. As a result, no crack generation was detected.

The present invention is not limited to the embodiments mentioned above, but various alternations are possible. For example, in the embodiment mentioned above, use is made of $Si_3N_4$ as the ceramic material, but other ceramic materials such as silicon carbide, sialon, or the like can be used. Moreover, as for the metal material, other metal materials can be preferably used. Further, it should be noted that it is preferred also to control the circularity of the recess of the metal member.

As mentioned above, according to the invention, since the ratio D={c(circularity of outer portion of projection)/d(outer diameter of projection)}×100(%) is set to less than 0.03%, the stress concentration generated at the connection edge of the ceramic member can be reduced, and a ceramic-metal composite joint body having good reliability and durability can be obtained.

What is claimed is:

1. A method of producing a ceramic-metal composite joint body, comprising:
   providing a rotary ceramic member having a substantially cylindrical axial projection formed thereon;
   controlling a circularity of said projection dependent upon an outer diameter of said projection by grinding an outer surface of at least a portion of said projection to such an extent that cross-sections of said portion of said projection have a circularity value c, and a ratio D between said circularity c and an outer diameter d of said projection fulfills the following inequality:

$$(c/d) \times 100(\%) \leq 0.03\%;$$

providing a metallic member having a substantially cylindrical recess formed therein; and
   inserting and fixing said portion of said projection in said recess.

2. The method of claim 1, wherein said portion of said projection is fixed in said recess by a method selected from the group consisting of pressure insertion, thermal insertion, chill insertion, soldering, and combinations thereof.

3. A method of producing a turbo charger rotor, comprising:
   forming a ceramic rotor having a ceramic head portion and a substantially cylindrical ceramic shaft axially projecting from said head portion;
   controlling a circularity of said ceramic shaft dependent upon an outer diameter of said ceramic shaft by grinding an outer surface of at least a portion of said ceramic shaft to such an extent that cross-sections of said portion of said ceramic shaft have a circularity value c, and a ratio D between said circularity c and an outer diameter d of said ceramic shaft fulfills the following inequality:

$$(c/d) \times 100(\%) \leq 0.03\%;$$

forming a metallic shaft having a substantially cylindrical recess formed therein, an axis of said recess being formed substantially coaxial with a rotational axis of said metallic shaft; and
   inserting and fixing said portion of said ceramic shaft in said recess of said metallic shaft.

4. The method of claim 3, wherein said portion of said ceramic shaft is fixed in said recess by a method selected from the group consisting of pressure insertion, thermal insertion, chill insertion, soldering, and combinations thereof.

5. The method of claim 3, wherein the ceramic rotor is made of a material selected from the group consisting of silicon nitride, silicon carbide and sialon.

6. The method of claim 3, wherein said metallic shaft is made of a material selected from the group consisting of precipitation hardening alloys and heat resisting alloys.

* * * * *